*US007430541B2*

US 7,430,541 B2

(12) United States Patent  (10) Patent No.: US 7,430,541 B2
Seo et al.  (45) Date of Patent: Sep. 30, 2008

(54) METHOD OF AND APPARATUS FOR UPDATING A DATABASE USING A RECORDABLE OPTICAL DISC

(75) Inventors: Joong-eon Seo, Uiwang-si (KR); Jung-wan Ko, Yongin-si (KR); Byung-jun Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 586 days.

(21) Appl. No.: 09/882,177

(22) Filed: Jun. 18, 2001

(65) Prior Publication Data
US 2002/0046176 A1    Apr. 18, 2002

(30) Foreign Application Priority Data
Jun. 17, 2000    (KR) ............................... 2000-33463

(51) Int. Cl.
H04K 1/00    (2006.01)
G11B 5/00    (2006.01)
(52) U.S. Cl. .................... 705/51; 711/100; 369/47.1
(58) Field of Classification Search ............ 705/16, 705/26–27, 51, 57–59, 75, 16.26–27; 707/9–10, 707/200–205; 713/151, 164–169; 711/1–6, 711/100, 129–130, 147–148, 173; 369/40, 369/47
See application file for complete search history.

(56) References Cited
U.S. PATENT DOCUMENTS
5,090,007 A    2/1992    Bulthuis .................. 369/275.4

5,241,531 A    8/1993    Ohno et al. ............... 369/275.2
5,644,782 A    7/1997    Yeates et al. ................ 395/830
5,694,546 A    12/1997    Reisman .................. 395/200.9

(Continued)

FOREIGN PATENT DOCUMENTS
CN    1082233    2/1994

(Continued)

OTHER PUBLICATIONS
Angel, "Lesson 129: Proxy Servers", Network, Apr. 1, 1999, ISSN: 1093-8001.*

(Continued)

*Primary Examiner*—Mary Cheung
(74) *Attorney, Agent, or Firm*—Stein, McEwen & Bui, LLP

(57) ABSTRACT

A method of and an apparatus for online modification/update of a database using a recordable optical disc. A user apparatus having a version of a database and an update date and time stored on the recordable optical disc communicates with a server which stores information for updating the database and an update date and time. A comparison of the respective dates and times is made and the server transmits updated information to the user apparatus based on the comparison. In one embodiment, the user apparatus transmits the update date and time stored on the recordable optical disc, the server makes the comparison and transmits the modified/updated information based on the comparison. In another embodiment, the user apparatus acquires the update date and time stored on the server, makes the comparison and acquires modified/updated information from the server based on the comparison.

9 Claims, 4 Drawing Sheets

U.S. PATENT DOCUMENTS

| | | | | |
|---|---|---|---|---|
| 5,751,997 A | * | 5/1998 | Kullick et al. | 711/162 |
| 5,778,383 A | * | 7/1998 | Grisar et al. | 707/200 |
| 5,924,096 A | | 7/1999 | Draper et al. | 707/10 |
| 6,011,764 A | * | 1/2000 | Itami et al. | 369/47.23 |
| 6,032,130 A | | 2/2000 | Alloul et al. | 705/27 |
| 6,061,686 A | * | 5/2000 | Gauvin et al. | 707/10 |
| 6,088,703 A | * | 7/2000 | Kaneko | 707/104.1 |
| 6,463,501 B1 | * | 10/2002 | Kern et al. | 711/100 |
| 2002/0004402 A1 | * | 1/2002 | Suzuki | 455/456 |

FOREIGN PATENT DOCUMENTS

| | | |
|---|---|---|
| EP | 0722144 A1 | 7/1996 |
| EP | 0 802 527 A1 | 10/1997 |
| EP | 0 817 181 A2 | 1/1998 |
| JP | 62283470 A * | 12/1987 |
| JP | 10-293707 | 11/1998 |
| JP | 11-066180 | 3/1999 |
| JP | 11-144322 | 5/1999 |

OTHER PUBLICATIONS

Office Action issued in Chinese Patent Application No. 01121036.2 on Sep. 9, 2005.

* cited by examiner

METHOD OF AND APPARATUS FOR UPDATING A DATABASE USING A RECORDABLE OPTICAL DISC

CROSS REFERENCE TO RELATED APPLICATIONS

This application claims the benefit of Korean Application No. 2000-33463 filed Jun. 17, 2000, in the Korean Patent Office, the disclosure of which is incorporated herein by reference.

BACKGROUND OF THE INVENTION

1. Field of the Invention

The present invention relates to a method of updating a database and an apparatus therefor, and more particularly, to a method of enabling a database to be modified in an online mode, using a recordable optical disc as a recording medium, and an apparatus therefor.

2. Description of the Related Art

There are many products which need frequent updates. Examples of such products are karaoke systems, encyclopedias, and navigational systems, of which corresponding databases and applications programs need frequent modification and updates.

Conventional database modification/update methods may be roughly divided into two groups. Hereinafter, one of the two groups will be referred to as an offline database operating method and the other will be referred to as an online database operating method.

In the offline database operating method, a read-only disc or a board, on which a plurality of read-only memories (ROMs) are mounted, is sold. Later, if the amount of data to be updated or modified is small, a file or a mask ROM having the updated data is distributed. If the amount of data to be updated or modified is great, a new disc or a new board is manufactured and distributed freely or sold.

In the online database operating method, only a basic system or program is distributed. Then a user is guided to register, and a needed database is provided online. When a user requests data, the data is transmitted to the user's system connected to the database so that the user has access to the data.

In the offline database operating method, if updating of data occurs frequently, costs are increased for both the database user and the database vendor and updating uses a lot of time. That is, even in a case where only data is updated, the data is updated, distributed through a route, and installed by the user.

In addition, if a program or system is updated, much more time is consumed. For example, in a karaoke system, songs frequently need to be added, and frequent updating costs time and money. If frequent updates occur after an initial installation, it will cost the user much time, money, and effort. If frequent updates do not occur, users will complain about outdated products or services.

Compared with the offline database operating method, the online database operating method has an advantage of needing less time and expense for updating. However, to use an online database, the user must be able to access the network and provide user information, and therefore there are location and situational restrictions. That is, the user cannot use the updated data and cannot provide user information in a place where a computer system or other access device is not installed. Also, to maintain a continuously connected environment costs the user more money.

SUMMARY OF THE INVENTION

To solve the above problems, it is a first object of the present invention to provide an improved database updating apparatus in which consumption of time and expense is reduced.

It is a second object of the present invention to provide an improved method of updating a database.

It is a third object of the present invention to provide a server for updating a database.

It is a fourth object of the present invention to provide an optical disc recording/reproducing apparatus for maintaining an updated database.

Additional objects and advantages of the invention will be set forth in part in the description which follows, and, in part, will be obvious from the description, or may be learned by practice of the invention.

To accomplish the first object of the present invention, a database updating apparatus comprises: a computer network; a server which provides database-related information through the computer network; and a user computer which accesses the server through the computer network and retrieves the database-related information. The user computer includes an optical disc recording/reproducing apparatus which records data in and/or reproduces data from an optical disc, in which a database and a date and time of a last update are recorded. The optical recording/reproducing apparatus is programmed to record modified/updated data, which is transmitted from the server, on the optical disc. The server is programmed so that the server receives the date and time of the last update, which is recorded on the optical disc and transmitted from the user computer, and if modification/update of the data base recorded on the optical disc is needed, the server transmits modified/updated data to the user computer in order for the user computer to record the modified/updated data on the optical disc through the optical disc recording/reproducing apparatus.

To accomplish the second object of the present invention, a method of updating a database comprises: permitting a user computer having a recordable disc, on which is recorded a database that a database vendor provides, to access a server of the database vendor through a computer network; receiving a date and time of the last update of the database recorded on the disc from the user computer and determining whether modification/update of the database recorded on the disc is needed; and transmitting modified/updated data to the user computer if modification/update is needed so that the user computer records modified/updated data on the disc.

To accomplish the third object of the present invention, a server for providing database-related information through a computer network comprises: a database server which stores at least modified/updated data of the database and a date and time of update in a memory; a receiving unit which receives the date and time of the last update of a database installed in a user computer from the user computer which accesses the server through the computer network; a determining unit which determines whether an update is needed in the database installed in the user computer by comparing the date and time of the last update input by the user with the date and time of update stored in the database server; and a reader which reads the modified/updated data from the memory and transmits the data to the user computer, if the determining unit determines that an update of the database installed in the user computer is needed.

To accomplish the fourth object of the present invention, an optical disc recording/reproducing apparatus comprises: a recordable disc on which an updatable database and an update date and time of the database are recorded; an inputting unit which receives modified/updated data of the database from the user computer; a recording unit which records the modified/updated data of the database, the date and time of update, and an updated address table on the disc; and an updated address table generating unit which updates an updated address table having addresses, of which the updated contents are recorded on the disc, and which provides the updated address table to the recording unit.

BRIEF DESCRIPTION OF THE DRAWINGS

The above objects and advantages of the present invention will become more apparent by describing in detail embodiments thereof with reference to the attached drawings in which.

DESCRIPTION OF THE PREFERRED EMBODIMENTS

Figure 1:
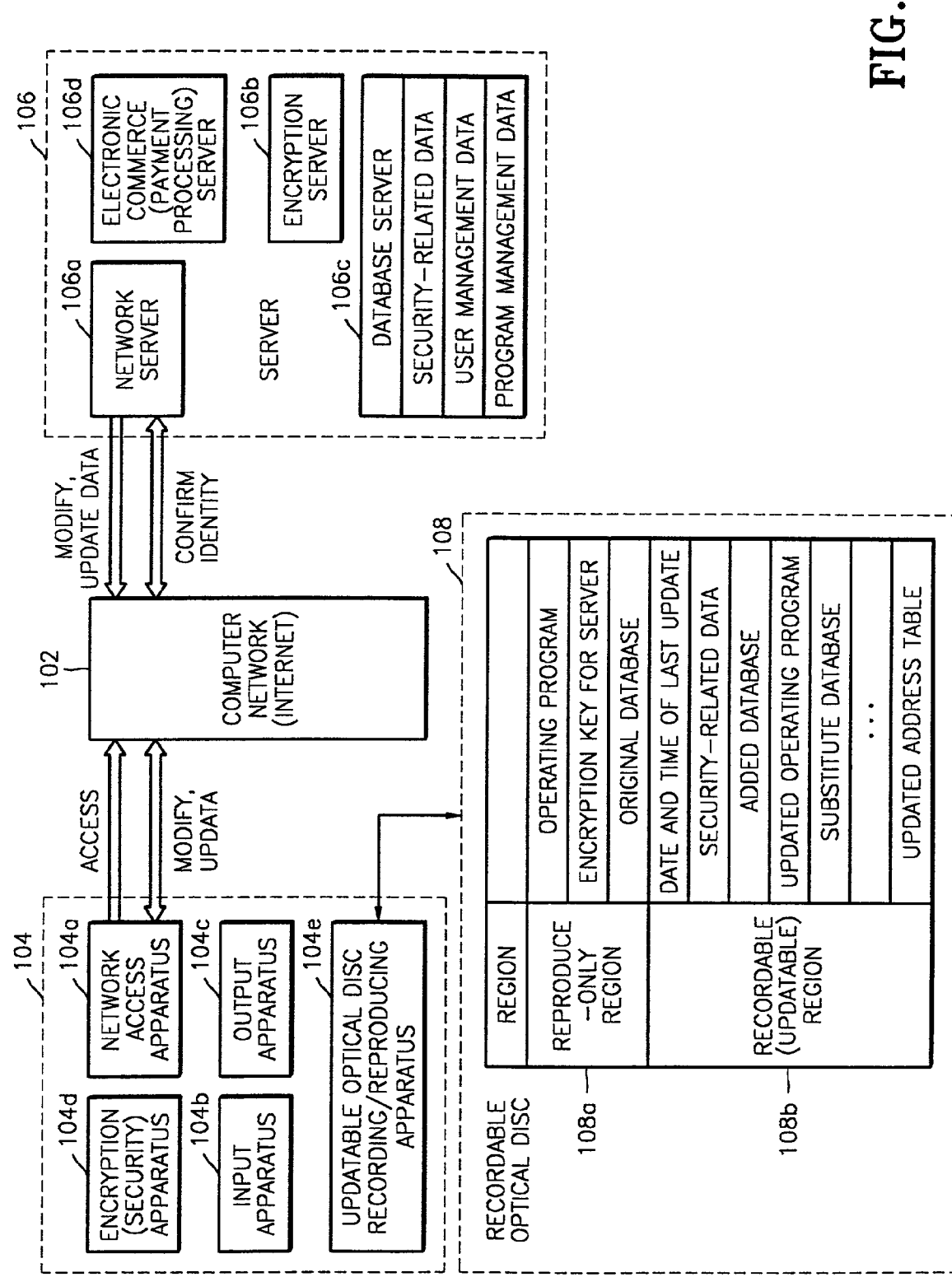
FIG. 1 is a block diagram of a database updating apparatus according to the present invention.

Reference will now be made in detail to the present embodiments of the present invention, examples of which are illustrated in the accompanying drawings, wherein like reference numerals refer to like elements throughout.

Referring now to FIG. 1, an apparatus for updating a database comprises a computer network 102, a user computer 104, which is connected to the computer network 102 and receives data which is updated/modified (hereinafter, referred to as updated/modified data), and a server 106 which transmits updated/modified data to the user computer 104.

The computer network 102 is a network which transmits and receives data between computers such as, for example, Ethernet, Internet, Local Area Network (LAN), Wide Area Network (WAN), and the like. The Internet is preferred for use with the present invention.

The user computer 104 is implemented in the form of a desktop computer or a personal computer. The user computer 104 comprises a network access apparatus 104a which permits access to the computer network 102 and transmits and receives data through the computer network 102; an input apparatus 104b which provides commands, data, etc., which are provided by a user, to the user computer 104; an output apparatus 104c which provides data requested by the user in the form of a hard copy, file, graphic, etc.; an encryption apparatus 104d, which, together with an encryption server 106b of the server 106, authenticates the user; and an optical disc recording/reproducing apparatus 104e which records data on or reproduces data from an updatable optical disc 108.

The optical disc 108 comprises a reproducible region 108a and a recordable region 108b. Like a CD-ROM or DVD-ROM, data in the reproducible region 108a cannot be deleted and is only reproduced. Like a CD-R, CD-RW, DVD-RAM, DVD-RW, data may be recorded in the recordable region 108b and previously recorded data recorded in the recordable region 108b may be deleted.

The optical disc recording/reproducing apparatus 104e reproduces data from the reproducible region 108a and the recordable (updatable) region 108b of the optical disc 108 or records modified/updated data, which is received through the network access apparatus 104a, in a recordable region 108b of the optical disc 108.

The optical disc 108 is provided to users through vendors of products, such as karaoke systems, encyclopedias, and navigation systems. In the reproducible region 108a, an operating program, an encryption key for server, and an initial version database are recorded. The operating program comprises a function for operating a database, and a function for recording data, which is needed in the modification/update and is provided by the server 106.

The recordable region 108b is a region for recording modified/updated data provided from a product vendor or a database vendor. In the recordable region 108b, date and time of update, security related data, added databases, updated operating programs, substitute databases, an updated address table, etc., are recorded. Here, the date and time of the update is used to determine whether a database recorded on the optical disc 108 has been updated.

The server 106 functions as a web server which transmits and receives data through the Internet or other computer network and comprises hardware and software for communication with the user computer 104. The server 106 comprises a network server 106a which transmits modified/updated data; an encryption server 106b which, together with the encryption apparatus 104d of the user computer 104, processes user authentication; a database server 106c which stores modified/updated data, security related data, consumer information, purchase information, etc., and provides the stored information to the user computer 104 connected through the computer network 102; and an electronic commerce server 106d which performs payment functions of electronic commerce.

The optical disc 108, on which are recorded an initial database (karaoke systems, encyclopedias, navigation systems, product catalogues, etc.) and an encryption key which is used in the server 106 is distributed to the user. The user installs the distributed optical disc 108 in the user computer 104 and uses the optical disc 108. The user computer 104 accesses the computer network 102, and accesses the server 106 through the computer network 102, receives modified/updated data through the computer network 102, and records the modified/updated data on the optical disc 108.

The network server 106a and the database server 106c are included in the server 106 which is operated by the database vendor. The database server 106c manages user related information and modified/updated data. The server 106a may also comprise an encryption server 106b responsible for providing security.

The user is permitted access to the distributed database after registration in the server 106. Before accessing the database, the user computer 104 first compares the date and time of the last update of the database recorded on the optical disc 108 with the date and time of the last update of the database server 106c of the server 106. If the update dates and times are not the same, meaning that since the last update of the computer 104, additions and/or modifications of data, an operating program, or a database have been made, the user computer 104 receives modified/updated data transmitted from the server 106, automatically records the modified/updated data in the recordable region 108b of the optical disc 108, and records information related to the data in the updated address table located in the recordable region 108b of the optical disc 108, in a predetermined way. The updated address table fulfills the same function as a file allocation table (FAT) used in an ordinary computer file management system. Then, the user has access to the modified/updated database without continually accessing the server 106. A new update time and date is also recorded in the recordable region 108b. The new update time and date may be generated by the user computer 104 but the new update time and date are preferably generated by the server 106 to avoid a time mismatch between system times of the server 106 and the customer computer 104.

Information, which the updatable optical disc recording/reproducing apparatus 104e will refer to when loading a disc, is recorded in the updated address table. The information recorded in the updated address table comprises database address information, such as the address of each database recognition unit (object) and a substitute address, and program address information, such as the address of a replaced or modified program module. Also, information on a physical error region of the recordable region may be recorded so that the region of an error or problem will not be used and problems which may occur during system operation may be prevented. It is not necessary to log the recording order or address of added databases, substitute databases, and updated operating programs. The recording order or addresses of added databases may be recorded in order of occurrence in the updated address table. Also, the total space needed in the recordable region is recorded along with the date and time of the last update. If the needed space is not available, the user is informed of this and transmission is stopped. In this case, a program that deletes unnecessary data and recovers needed space may be used to check the updated address table and to find portions of the recordable region 108b which are not in use.

Figure 2:
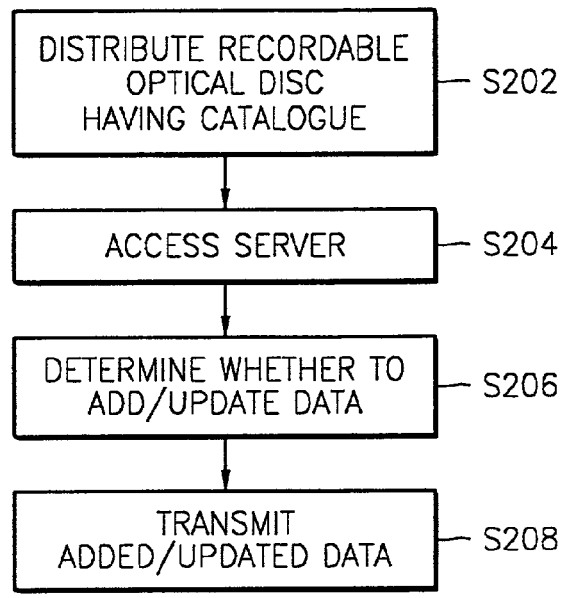
FIG. 2 is a flowchart of a database updating method according to the present invention.

FIG. 2 is a flowchart of a database updating method according to the present invention wherein an optical disc 108 having catalogue information is used as an example to explain the method.

A product vendor distributes a catalogue to a consumer by way of the optical disc 108. The optical disc 108 contains information on products that is recorded in the reproducible region 108a of the optical disc 108. Upon distribution of the optical disc 108, no special registration or management is needed. The encryption key of the vendor is recorded only when user authentication is needed in operation S202.

The consumer accesses the server 106 of the product vendor through the computer network 102 in operation S204, accesses the electronic commerce server 106d of the vendor through the computer network 102 and registers as a buyer. Then, the electronic commerce server 106d adds the consumer's information to the database server 106c, guides the consumer to input a personal password to be used when buying a product, records the password in the database server 106c, and records an encrypted password to authenticate the personal password on the optical disc 108 of the consumer. By encrypting the password, password disclosure is prevented. Also, the consumer information and encrypted password may be used to direct mail (DM) to and identify the consumer. Furthermore, in this process, basic personal information of the consumer may be provided and thereafter the personal information may be used to analyze the consumer's buying pattern.

After the consumer has been authenticated, the date and time of the last update recorded on the optical disc 108 of the consumer is transmitted and received, and a determination is made whether to modify/update data in operation S206.

If any new additions or modifications are to be added based on the date and time of the last update recorded on the optical disc 108 of the consumer, the database server 106c transmits the needed data so that the data is recorded on the optical disc 108 of the consumer in operation S208, and the data may be used, being linked with the existing catalogue information originally distributed in operation S202. The updating process is more quickly done if executed during an idle time of the user computer 104. By doing so, information on added products, changed prices, stock, functions, or states is easily updated.

The consumer identifies products through product searching of the updated database on optical disc 108 and places an order via the Internet. After the consumer places the order, the server 106 receives basic information, such as method of payment and place of delivery, and requests input of a credit card number or information regarding another method of payment. Information on the method of payment is transmitted after a safe transmission route is secured through the encryption server 106b. The encryption server 106b confirms the identity by checking the password of the consumer. After the consumer identity is checked and input of the method of payment is completed, the vendor provides delivery of the ordered product, transmits related purchase information to the consumer, and records that information on the optical disc 108. This is a measure to cope with damages which may occur in the delivery, refund or exchange of the product where the product has a defect, and possible refusal to buy the product.

Figure 3:
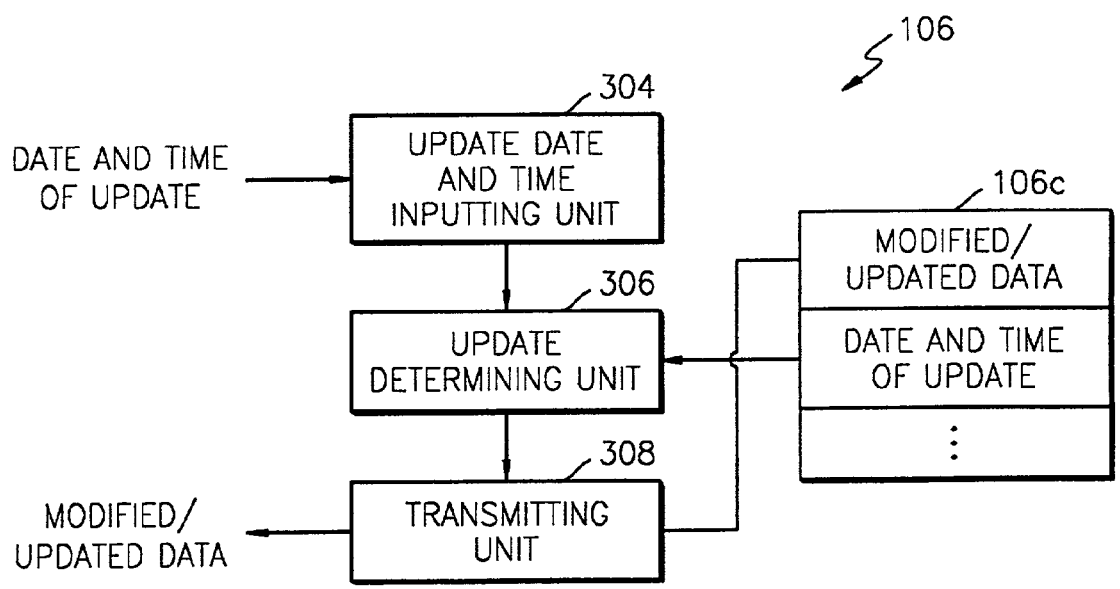
FIG. 3 is a block diagram of a server according to the present invention.

FIG. 3 is a block diagram of the server 106 according to the present invention. A database server 106c stores modified/updated data and date and time of update of the data. A date and time of update inputting unit 304 receives a date and time of a last update of a database installed in the user computer 104 (FIG. 1) from the user computer 104 which accesses the database server 106c through a computer network, such as for example, the Internet.

An update determining unit 306 compares the date and time of the last update received from the user computer 104 with the date and time of the last update stored in the database server 106c to determine whether the database installed in the user computer 104 needs to be updated. If the update determining unit 306 determines that updating the database installed in the user computer 104 is needed, a transmitting unit 308 reads modified/updated data from the database server 106c and transmits the data to the user computer 104.

The date and time of update inputting unit 304, the update determining unit 306, and the transmitting unit 308 of FIG. 3 may be implemented as hardware, but are preferably implemented as software programs. For example, a web server receives the date and time of last update of the database installed in the user computer 104 and transmitted from the user computer 104 through the user interface, and determines whether an update is needed based on the received date and time of update. If an update is needed, the web server automatically transfers modified/updated data stored in the database server 106c to the user computer 104 as directed by programmed instructions of the web server.

Figure 4:
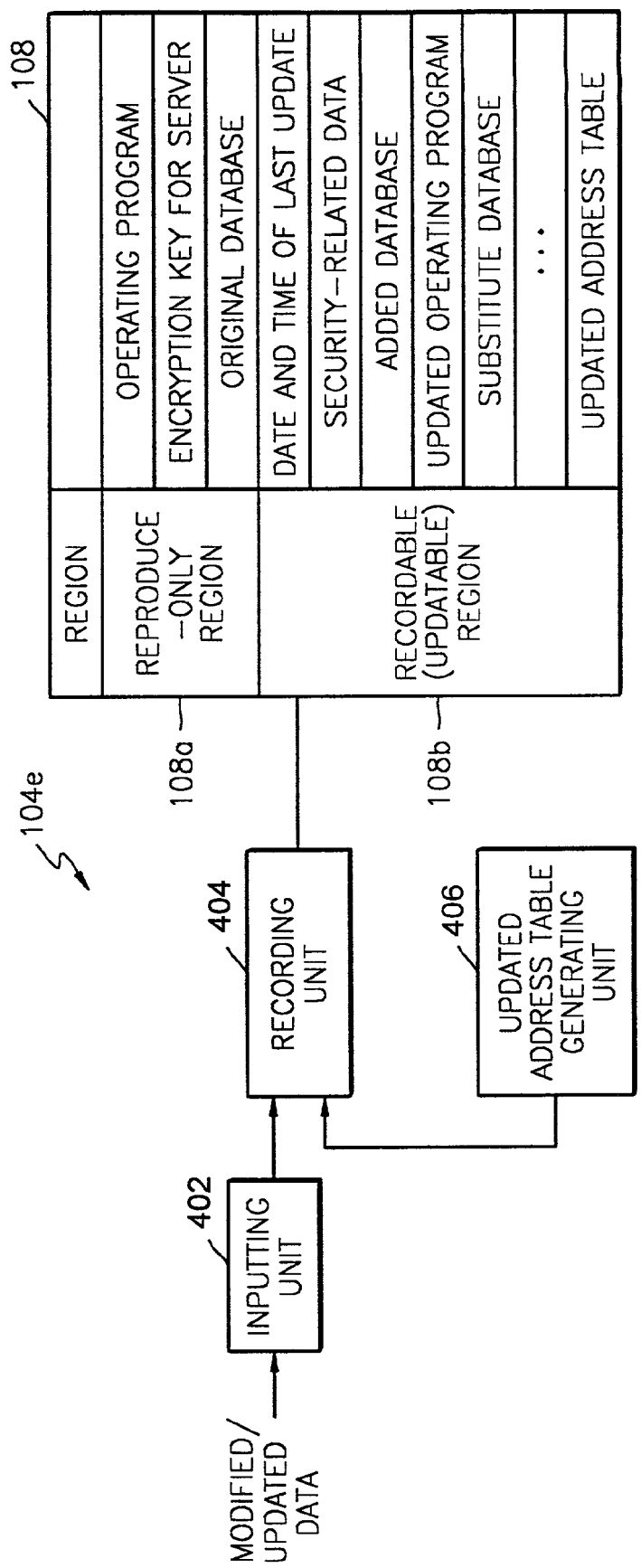
FIG. 4 is a block diagram of an embodiment of a disc recording and/or reproducing apparatus according to the present invention.

FIG. 4 is a block diagram of an embodiment of an optical disc recording/reproducing apparatus 104e according to the present invention. The optical disc recording/reproducing apparatus 104e communicates with the server 106 (FIG. 3), and the server 106 determines whether an update is needed. A database and an update date and time of the database are recorded on the optical disc 108.

Where the server 106 determines that an update is needed, the server 106 transmits modified/updated data to the user computer 104 and an inputting unit 402 receives the modified/updated data from the user computer 104. A recording unit 404 records the modified/updated data, the date and time of update, and an updated address table on the optical disc 108

(FIG. 1). An updated address table generating unit 406 generates an updated address table having addresses of the optical disc 108 on which updated contents are recorded and provides the table to the recording unit 404.

In the apparatus of FIG. 4, the updated address table generating unit 406 is preferably implemented as software by an operating program. The updated address table operating program comprises a database updating module which accesses the server 106 through the user computer 104 and the computer network 102, and where the server 106 is accessed, the database updating module reads the date and time of the last update from the optical disc 108 and provides the date and time of update to the server 106.

The server 106 determines whether an update is needed, and if the update is needed, transmits modified/updated data.

Figure 5:
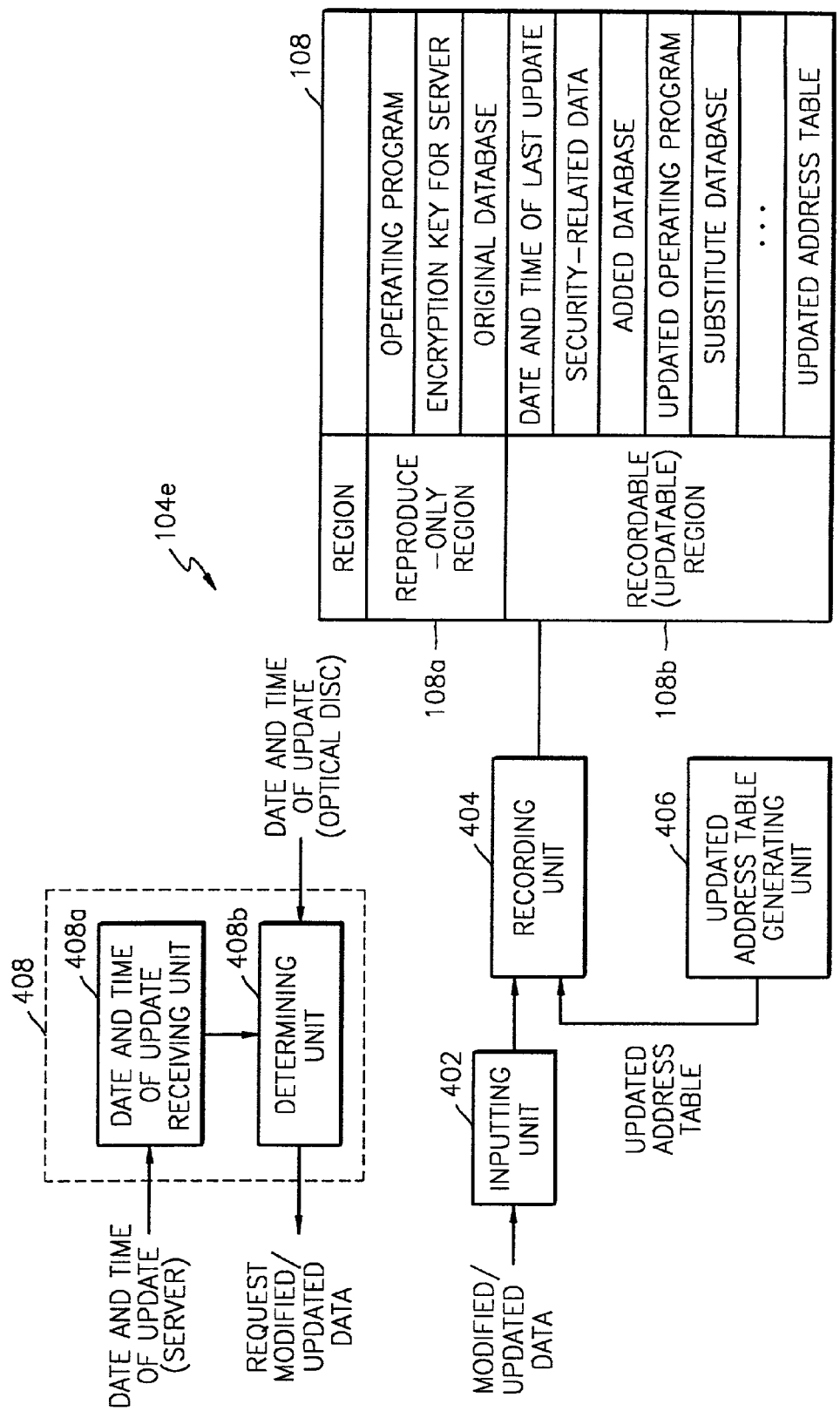
FIG. 5 is a block diagram of another embodiment of a disc recording and/or reproducing apparatus according to the present invention.

FIG. 5 is a block diagram of another embodiment of an optical disc recording/reproducing apparatus according to the present invention. Referring to FIG. 5, a database and an update date and time of the database are recorded on the optical disc 108. An inputting unit 402 receives modified/updated data from the user computer 104. A recording unit 404 records the modified/updated data, a date and time of update, and an updated address table on the optical disc 108. An updated address table generating unit 406 generates an updated address table having addresses of the optical disc 108 in which modified/updated data are recorded and provides the table to the recording unit 404.

An update determining unit 408 accesses the server 106 through the user computer 104 and the computer network 102 and determines whether the database recorded on the optical disc 108 has been updated. If it is determined that an update of the database recorded on the optical disc 108 is needed, the update determining unit 408 requests the server 106 to transmit modified/updated data through the user computer 104 and the computer network 106.

The update determining unit 408 has a date and time of update receiving unit 408a which accesses the server 106 through the user computer 104 and the computer network 102, and where the server 106 is accessed, the receiving unit 408a receives the date and time of update of the database of the server 106. A determining unit 408b determines whether an update of the database recorded on the optical disc 108 is needed by comparing the date and time of update of the database of the server 106 with the date and time of update recorded on the optical disc 108.

In the apparatus of FIG. 5, the updated address table generating unit 406 is preferably implemented as software by an operating program. The operating program of the updated address table generating unit comprises a module which updates the database. The updating module accesses the server 106 through the user computer 104 and the computer network 102, and where the server 106 is accessed, requests the server 106 to transmit the date and time of update of the database of the server 106. Where the date and time of update of the database of the server 106 is input, the operating program determines whether the database has been updated by comparing the input date and time of update transmitted by the server 106 with the date and time of the last update recorded on the optical disc 108. If an update is needed, the operating program requests the server 106 to transmit modified/updated data, through the user computer 104 and the computer network 102.

As described above, the present invention provides for easily maintaining a user database that is up-to-date. The present invention is applicable to all systems that use a database, including karaoke systems, encyclopedias, and navigational systems. Also, since user information and user computer environments are stored together, the present invention solves the problems caused by different locations and different platforms.

According to the present invention, database vendors (product providers) may save time and money, easily provide up-to-date data, and easily manage users. Since modification is easily done, programs or data containing errors are easily added and various programs and/or data may be easily changed. The user is reliably and securely identified through the user optical disc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A database updating apparatus comprising:
   a network;
   a server arranged to provide database-related information, via the network; and
   a user computer arranged to access the server, via the network, and to retrieve the database-related information,
   wherein the user computer comprises an optical disc recording/reproducing apparatus, and is configured to:
   record data on and reproduce data from an optical disc, in which a database an encryption key, and a date and time of a last update of the database are recorded, wherein the date and time of the last update are generated by the server,
   transmit the date and time of the last update to the server,
   record modified/updated data for initial data of the database on the optical disc, and
   record an encrypted password which is encrypted using the encryption key on the optical disc;
   wherein the server determines if modification/update of the database recorded on the optical disc is needed based on the transmitted date and time, and transmits the modified/updated data to the optical disc recording/reproducing apparatus, and
   wherein the initial data of the database is recorded in a read only region of the optical disc prior to a first access of the server by the user computer, and the modified/updated data for the initial data of the database transmitted from the server is recorded in a recordable region of the optical disc.

2. The apparatus of claim 1, wherein the server transmits a purchase order, which is received from the user computer, to the user computer and the optical disc recording/reproducing apparatus records the purchase order on the optical disc.

3. The apparatus of claim 1, wherein the encryption key is recorded in the read only region of the optical disc prior to the first access of the server by the user computer.

4. The apparatus of claim 1, wherein the encrypted password is recorded in the recordable region of the optical disc.

5. A method of updating a database comprising:
   permitting a user computer usable with an optical disc, on which a vendor database and an encryption key are recorded in a read only region of the optical disc, to access a server of the database vendor, via a network;
   recording an encrypted password which is encrypted using the encryption key on the optical disc:
   receiving a date and time of a last update of the database recorded in a recordable region of the optical disc from the user computer, and determining whether modification/update of the database is needed based on the received date and time, wherein the date and time of the last update are generated by the server;

transmitting modified/updated data to the user computer if modification/update is needed; and recording the modified/updated data in the recordable region of the optical disc.

6. The method of claim 5, further comprising:

recording a new date and time of last update of the disc in the recordable region.

7. The method of claim 5, further comprising:

transmitting a purchase order from the user computer to the vendor server;

transmitting information related to the purchase order from the vendor server to the user computer; and recording the purchase order information on the recordable region of the optical disc.

8. The method of claim 5, wherein the encrypted password is recorded in the recordable region of the optical disc.

9. A method of distributing and maintaining a database, the method comprising:

distributing an optical disc having a read-only region in which a data base corresponding to a first date and time and an encryption key are recorded and a recordable region in which the first date and time is recorded;

operating the optical disc in a user computer having an optical disc reproducing/recording apparatus;

maintaining update data for the data base corresponding to a second date and time when the data base was updated on a server;

accessing the server and transmitting the first date and time to the server;

comparing the first date and time with the second date and time;

transmitting the update data and the second date and time to the user computer if the second date and time is later than the first date and time;

storing the update data and an encrypted password which is encrypted using the encryption key in the recordable region of the optical disc; and updating the first date and time stored in the recordable region to the second date and time, wherein the first and second dates and times are generated by the server.

\* \* \* \* \*